(12) United States Patent
Kim et al.

(10) Patent No.: US 6,958,786 B2
(45) Date of Patent: Oct. 25, 2005

(54) MONITOR HAVING RIBS FOR FIXING A CRT

(75) Inventors: Jin-Pyeong Kim, Icheon-shi (KR); Jae-Sun Woo, Kwangmyoung-shi (KR)

(73) Assignee: Imagequest Co., Ltd., (KR)

( * ) Notice: Subject to any disclaimer, the term of this patent is extended or adjusted under 35 U.S.C. 154(b) by 503 days.

(21) Appl. No.: 10/098,197

(22) Filed: Mar. 13, 2002

(65) Prior Publication Data

US 2002/0130954 A1 Sep. 19, 2002

(30) Foreign Application Priority Data

Mar. 15, 2001 (KR) .............................. 2001-13358
Dec. 28, 2001 (KR) .............................. 2001-87060

(51) Int. Cl.⁷ .............................................. H04N 5/64
(52) U.S. Cl. .................... 348/836; 312/7.2; 348/825
(58) Field of Search ................. 348/825, 836; 312/7.2, 223.2, 223.3; 248/917; D14/307, D14/308, 336, 371, 448, 126

(56) References Cited

U.S. PATENT DOCUMENTS 4,489,993 A * 12/1984 Hasegawa et al. ........... 312/7.2
RE37,502 E * 1/2002 Siccardo ...................... 348/827
2002/0158839 A1 * 10/2002 Hirota et al. ................ 345/156

FOREIGN PATENT DOCUMENTS

JP 2000217052 A * 8/2000 ............ H04N 5/64

* cited by examiner

Primary Examiner—Victor R. Kostak
(74) Attorney, Agent, or Firm—Howrey LLP

(57) ABSTRACT

The present invention relates to the monitor having ribs for fixing a CRT comprising a CRT, a shield cover which is assembled enclosing said CRT from behind and a monitor case composed of at least two covers which enclose said CRT and said shield cover, and are joined one another by joining members, wherein the ribs for fixing the CRT are formed protruding from the inner surface of said monitor case in accordance with the shape and contours of the outer periphery of the CRT so that the CRT is fitted into the ribs and secured by joining force between said covers which are joined by said joining members. Since the CRT is fixed by the binding force between the covers comprising the monitor case and by said fixing ribs for the CRT, fixing lugs at each edges of the CRT are not necessary. Accordingly, there arises a merit that the size of the monitor can be reduced close to the actual screen size. And various kinds of incidental expenses for transportation and loading of the CRT are also reduced since the size of the CRT can be reduced.

8 Claims, 4 Drawing Sheets

Prior Art

MONITOR HAVING RIBS FOR FIXING A CRT

This application claims priority under 35 U.S.C. § 119 to Korean Patent applications Nos. 10-2001-0013358, filed Mar. 15, 2001, and 10-2001-0087060, filed Dec. 28, 2001.

BACKGROUND OF THE INVENTION

1. Field of the Invention

The present invention relates to a monitor which is an output device of the computer, TV or other electronic products. More particularly, the present invention relates to a monitor having ribs for fixing a CRT the ribs being protruded matching the shape and contours of the CRT.

2. Description of the Related Art

Generally, a monitor comprises a CRT (Cathode Ray Tube) in whose front portion is formed a screen displaying output information, a main board in which a plurality of electronic circuits and accessories are mounted, main sash in which the main board is mounted, a shield which blocks the electromagnetic wave, and a monitor case in which above parts are assembled.

FIG. 1 is an exploded slant view of a common prior art monitor. As shown in the figure, the prior art monitor comprises a front cover 1 combined with the screen side of the CRT 2 while forming the front portion of the monitor housing, the CRT 2 having fixing lugs 2a at each edges, a shield cover 5 covering the CRT, a main board 3 combined with the bottom of the CRT 2, a main sash 4 in which said main board is mounted, and a rear cover 6 which covers said CRT 2 and shield cover 5 and is combined with the front cover 1.

The prior art monitor as said above is assembled by fixing the CRT 2 and other components into the front cover 1, and then combining the rear cover 6 with said front cover 1. Detailed process of the assembling is explained as follows:

First, the main sash 4 in which the main board 3 is mounted is bolted onto the bottom portion of the inner wall of the front cover 1 at right angle to each other, and then the CRT 2 is fixed into the rear cover 6 by screwing screws into junction holes (not displayed) formed at each of the edges of the inner wall of said front cover 1 and fixing lugs 2a formed at each of the edges of the CRT 2. And the shield cover covers the rear portion of the CRT 2, the rear portion of the CRT 2 being thereafter contacted tightly by the rear cover 6 while screws are screwed into other junction holes formed in each of the edges of the front and the rear cover. And assembly of the monitor is finished.

However, this prior art monitor has problems as follows:

First, the size of the monitor is large compared to the actual screen size because of the fixing lugs equipped at each of the edges of the CRT, Secondly, productivity is low due to the complexity of the assembling process since the CRT is fixed by screws into the fixing lugs of the CRT and then the front cover and the rear cover are combined.

Thirdly, since the CRT is supported only by the four spots of junction holes formed at the edges of the inner wall of the front and the rear cover, said junction holes can be easily damaged due to strain stress originating from the weight of the CRT.

SUMMARY OF THE INVENTION

The object of the present invention is to solve above problems by providing a CRT having ribs for fixing a CRT, wherein the CRT is snugly fitted into the ribs for fixing a CRT and is fixed by combining force of at least two covers comprising the monitor case.

In order to achieve said object, the monitor having ribs for fixing a CRT according to the present invention comprises a CRT, a shield cover which is assembled enclosing said CRT from behind and a monitor case composed of at least two covers which enclose said CRT and said shield cover, and are joined one another by joining members, wherein the ribs for fixing the CRT are formed protruding from the inner surface of said monitor case in accordance with the shape and contours of the outer periphery of the CRT so that the CRT is fitted into the ribs and secured by joining force between said covers which are joined by said joining members.

The ribs for fixing the CRT comprises side fixing ribs which are protruded from both sides of the inner surface of the monitor case in accordance with the contours of side surfaces of the CRT so that the protruded surfaces of said side fixing ribs match the shape of side surface of the CRT, and lower fixing ribs which are protruded from the lower inner surface of the monitor case in accordance with the contours of bottom surface of the CRT so that the protruded surface of said lower fixing ribs matches the shape of bottom surface of the CRT.

The ribs for fixing the CRT further comprises upper fixing ribs which are protruded from the upper inner surface of the monitor case in accordance with the contours of top surface of the CRT so that the protruded surface of the upper fixing ribs matches the shape of top surface of the CRT.

In addition, the monitor case comprises a front cover which has fitting protrusions on its inner surface and is combined with the screen side of the CRT and a rear cover which encloses said CRT and said shield cover enclosing said CRT, and has, in its front portion, fitting grooves into which said fitting protrusions of the front cover are fitted, and is joined with said front cover. As readily can be seen, the monitor case can be constructed in the form of a upper cover and a lower cover, or a right cover and a left cover, as well as a front cover and a rear cover. Also, screws can be used as a joining member as well as fitting grooves and fitting protrusions.

And a plurality of joining guides which guide joining of the front cover and the rear cover can be formed at both side end sections of the front surface of the rear cover.

BRIEF DESCRIPTION OF THE DRAWINGS

REPRESENTATIVE FIGURE: FIG. 2

Figure 1:
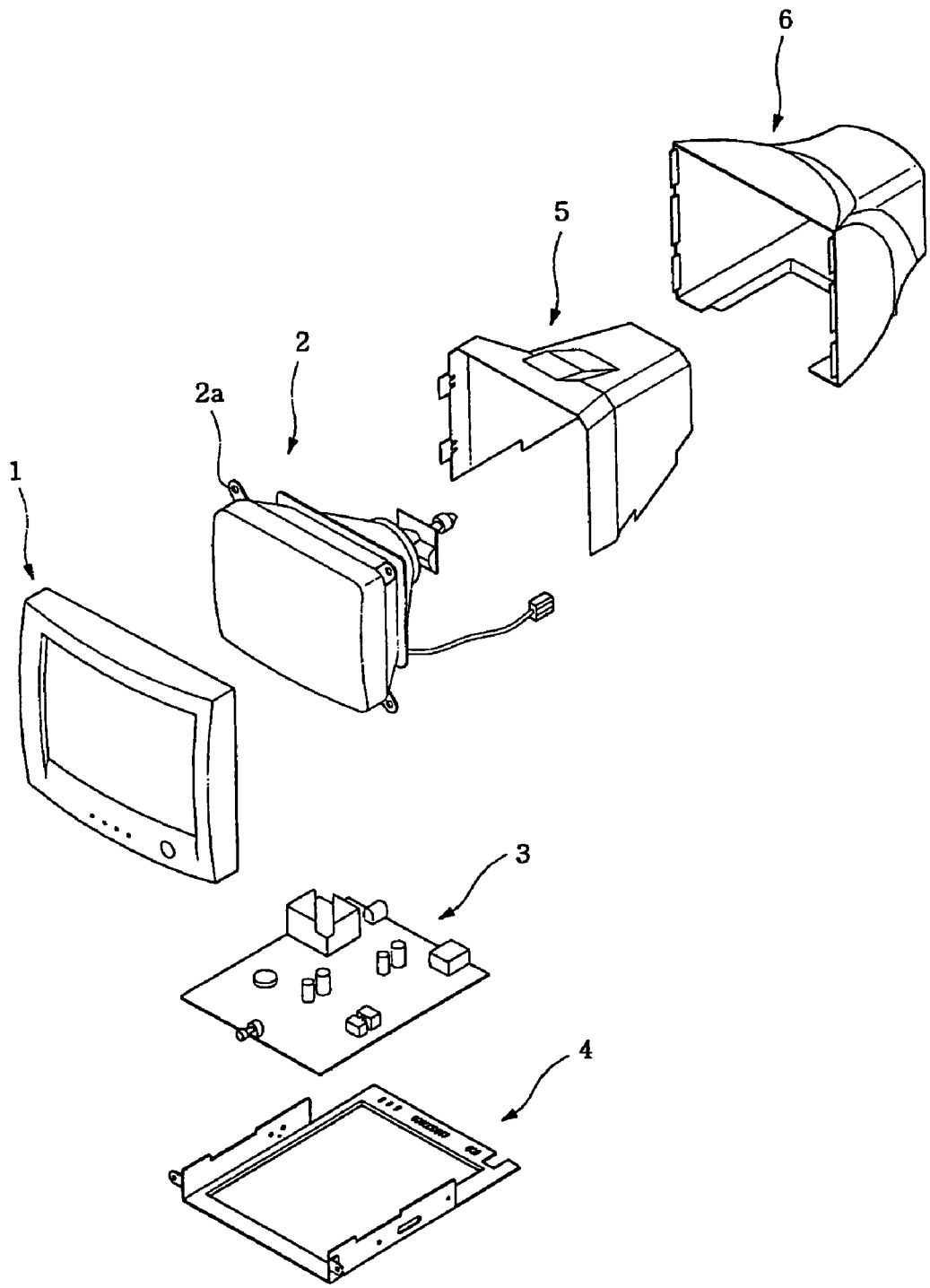
FIG. 1 is an exploded slant view of a prior art monitor, wherein a CRT is fixed with fixing lugs.

Explanation of Symbols of Primary Parts in the Figures

110 . . . front cover,
111 . . . fitting protrusion
120 . . . front panel,

130 ... bottom panel
150 ... rear cover,
151 ... fitting groove
152 ... joining guide,
160 ... upper cover
170 ... lower cover,
181 ... side fixing ribs
182 ... lower fixing ribs,
183 ... upper fixing ribs
200 ... CRT,
300 ... shield cover
400 ... main board,
500 ... main sash

BEST MODE FOR CARRYING OUT THE
INVENTION

Figure 2:
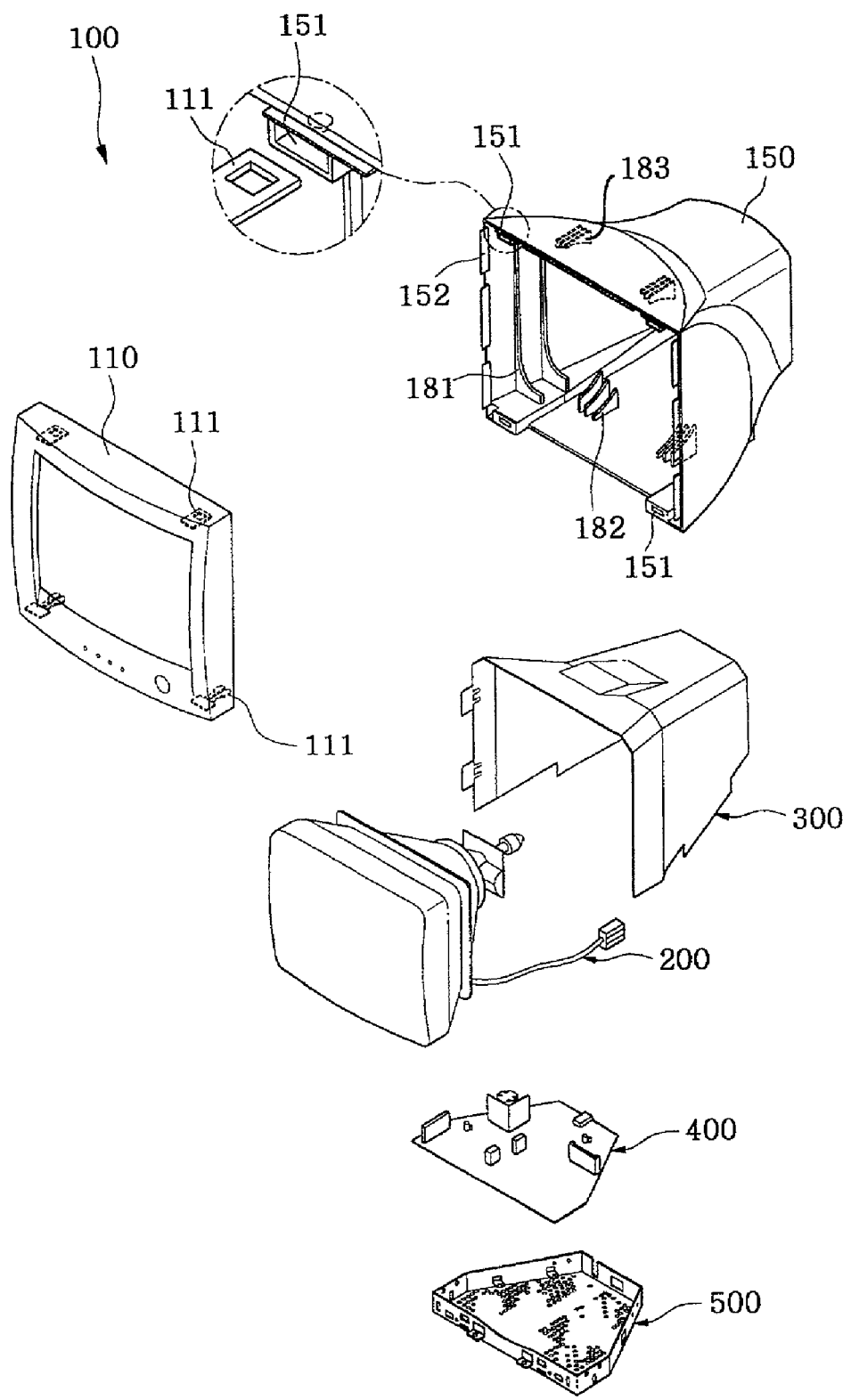
FIG. 2 is an exploded slant view of one embodiment of a monitor having ribs for fixing a CRT according to the present invention.

The best mode for carrying out the present invention will be described in detail with reference to the accompanying drawings in which:

FIG. 2 is an exploded slant view of one embodiment of a monitor having ribs for fixing a CRT according to the present invention.

With reference of FIG. 2, the front cover 110, which is in a quadrilateral shape to match the screen of the CRT 200, has fitting protrusions 111 in the portion close to the edges of the inner wall. Said fitting protrusions 111 should be formed at the portion where the weight of the front cover 110 can be effectively dispersed and supported, and preferably at the portion close to each edge or each edges of the inner wall of the front cover 110 as described above.

It is desirable to form said fitting protrusions 111 in pair of different shapes in order to make fitting and dividing convenient. In this embodiment, fitting protrusions 111 in shape of plate are formed at upper part of the front cover 110, and fitting protrusions 111 in shape of hook are formed at the lower part of the front cover 110. The fitting protrusions 111 in shape of hook are elastic, and have fitting projections in the front portion, and junction holes are formed at the center of the fitting protrusions 111 in shape of plate.

The shape of the rear cover 150 is of hexahedron whose front portion is open, and have fitting grooves 151 at the portion close to each edges or each edges of said front portion (i.e., at the portion corresponding to the portion of the fitting protrusions 111 of said front cover 110). Said fitting grooves 151 also comprise two kinds of fitting grooves 151 corresponding to the fitting protrusions 111 in shapes of plate and hook, and formed at the upper and the lower portion of said rear cover 150. At the upper section of the inner wall of the fitting grooves 151 of the upper and front portion of the rear cover 150 which correspond to the fitting protrusions 111 in shape of plate, there are formed fitting protrusions fitted into junction holes of said fitting protrusions 111 in shape of plate. The fitting grooves 151 at the lower portion of the front portion of the rear cover 150 which correspond to the fitting protrusions 111 in shape of hook have narrower width of mouth than the front of the fitting protrusions in shape of hook. However, the protrusions in shape of hook can be fitted into said fitting grooves 151 since it is elastic.

The shape of the CRT 200 is of a quadrangular pyramid whose rear is narrower than the front, and each of the external surfaces of the CRT is inclined by predetermined angles in the lengthwise direction from the front toward the rear.

At both inner sides of said rear cover 150, side fixing ribs 181 which prevent the CRT 200 from yawing are protruded matching inclination of the lengthwise direction of the sides of said CRT 200. In other words, since the inclination of the lengthwise direction of the sides of said CRT 200 becomes steep toward the rear, the more said side fixing ribs 181 become protruded against the CRT 200, the closer they are to the rear of inner side surfaces of the rear cover. Protruded surfaces of said side fixing ribs (i.e., surfaces contacting the CRT) are smoothly curved matching the curves of the sides of the CRT 200.

FIG. 2 illustrates that the lower portion of the side fixing ribs 181 is protruded enough to sustain part of the bottom surface of the CRT 200. In this way, said side fixing ribs 181 can be extended from inner side surfaces of the monitor case to the part of the bottom surface and the ceiling surface along with the curve of the edges of the CRT 200.

And the lower fixing ribs 182 preventing the CRT 200 from yawing are protruded at both sides of the inner bottom surface of the rear cover 150. The closer the lower fixing ribs 182 are to the rear of the inner bottom surface, the more they become protruded while matching the inclination of the lower surface of the CRT 200. The protruded surfaces of said lower fixing ribs 182 (i.e., surfaces contacting the CRT) are inclined to match the inclination of the lengthwise direction of the CRT 200. And heights of said lower fixing ribs 182 are differently formed corresponding to the shape of the bilateral direction of the bottom surfaces of the CRT 200.

Said lower fixing ribs 182 are formed on the right and the left side of the inner bottom surfaces of the rear cover 150 to secure space to install the main sash 500. However, as long as the lower fixing ribs do not overlap the main sash, they can be formed on the front portion of the center of the inner bottom surface of the rear cover 150.

And upper fixing ribs 183 which match the shape and inclination of the upper portion of the CRT 200 are formed in the inner ceiling portion of the rear cover 150. The upper fixing ribs are protruded in the same shape and inclination as those of the lower fixing ribs for fixing 182, and prevent the CRT 200 from moving back and forth.

In this way, the monitor according to the present invention features that the weight of the CRT 200 is dispersed and supported by a plurality of fixing ribs for the CRT which are extended along with the surface of the CRT. Therefore, damage of inner portion of the monitor case 100 by the weight of the CRT is prevented.

In addition, combining guides 152 which are fitted into side ends of the inner wall of the front cover 110 are formed at both side end sections of the front of the rear cover 150.

Operation and assembling process of above embodiment will now be described along with other embodiments.

First, main sash 500 on which the main board 400 is beforehand mounted is mounted into the rear cover 150 by combining at least one inserting protrusions(not illustrated) formed on the inner bottom surface of the rear cover and inserting grooves formed on the main sash.

Next, after being covered by the shield cover 300, the CRT 200 is fitted into the side fixing ribs 181, lower fixing ribs 182 and upper fixing ribs of the rear cover 150. And when connector formed at the CRT 200 is connected into the connecting position of the main board 400, the CRT 200 and the main board can be electrified. Depending on the product, said shield cover 300 can contact said upper fixing ribs 183. However, in this embodiment, said shield cover is positioned at slightly hinder position of the front of the CRT so that said shield cover does not contact the upper fixing ribs 183.

And fitting protrusions 111 of the front cover 110 are fitted into fitting grooves 151 of the rear cover 150 and the front cover 110 is stuck fast to the rear cover 150. At this time, the exterior of the CRT is fitted tightly into the fixing ribs which comprise the side fixing ribs 181, lower fixing ribs 182 and upper fixing ribs 183 by the pressure of the connection of said fitting protrusions and said fitting grooves. Then the CRT 200 is fixed into the monitor case 100 at one time, assembly of the monitor being completed.

At this time, the joining guides 152 formed at both side ends of the front of the rear cover 150 are combined into the side ends of the inner walls of the front cover 110, the joining guides 152 guide joining of said fitting protrusions 111 with said fitting grooves 151. These joining guides also serve to reinforce the joining of the front and the rear cover.

Figure 3:
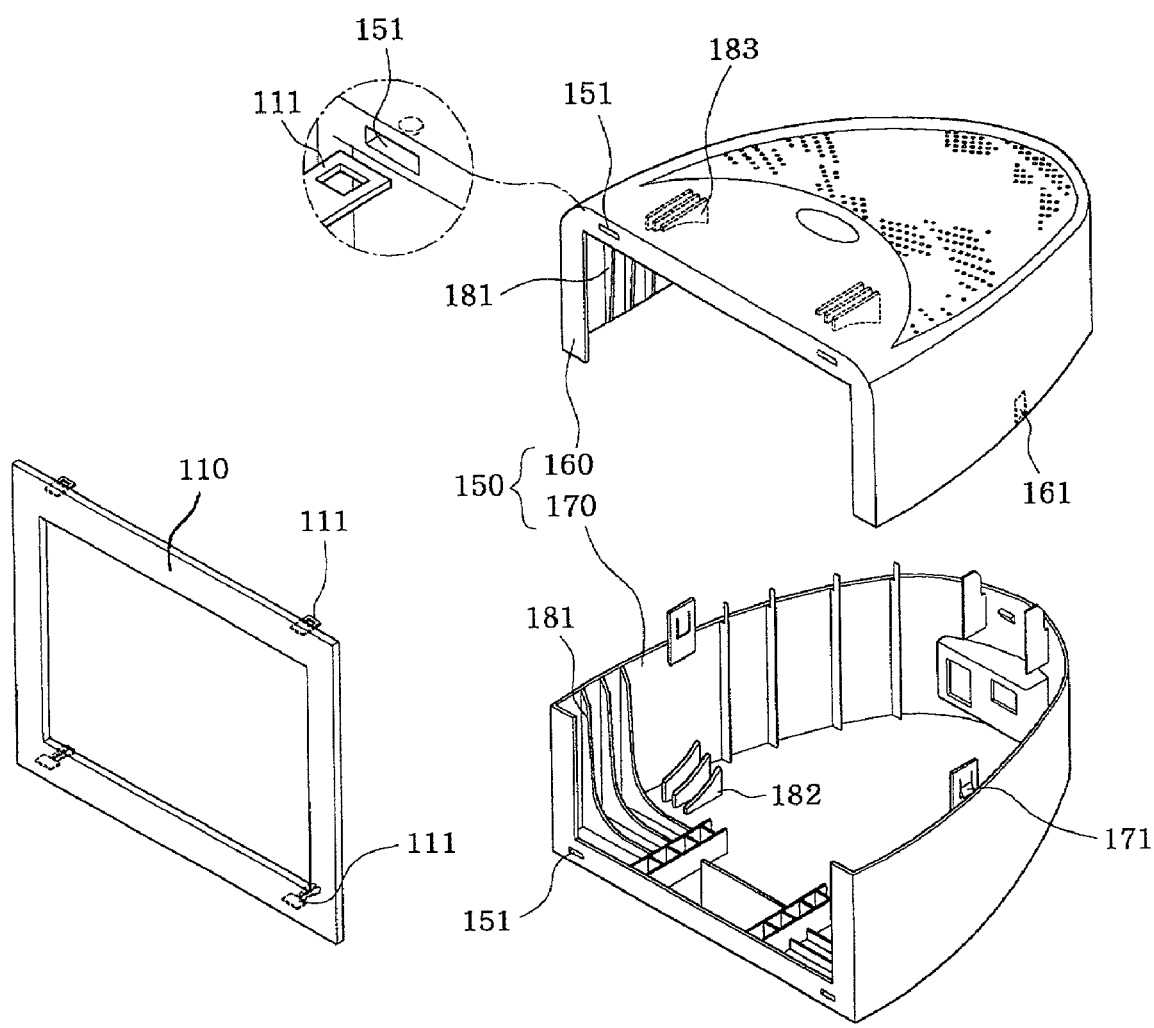
FIG. 3 is an exploded slant view of another embodiment of a monitor having ribs for fixing a CRT according to the present invention.
Figure 4:
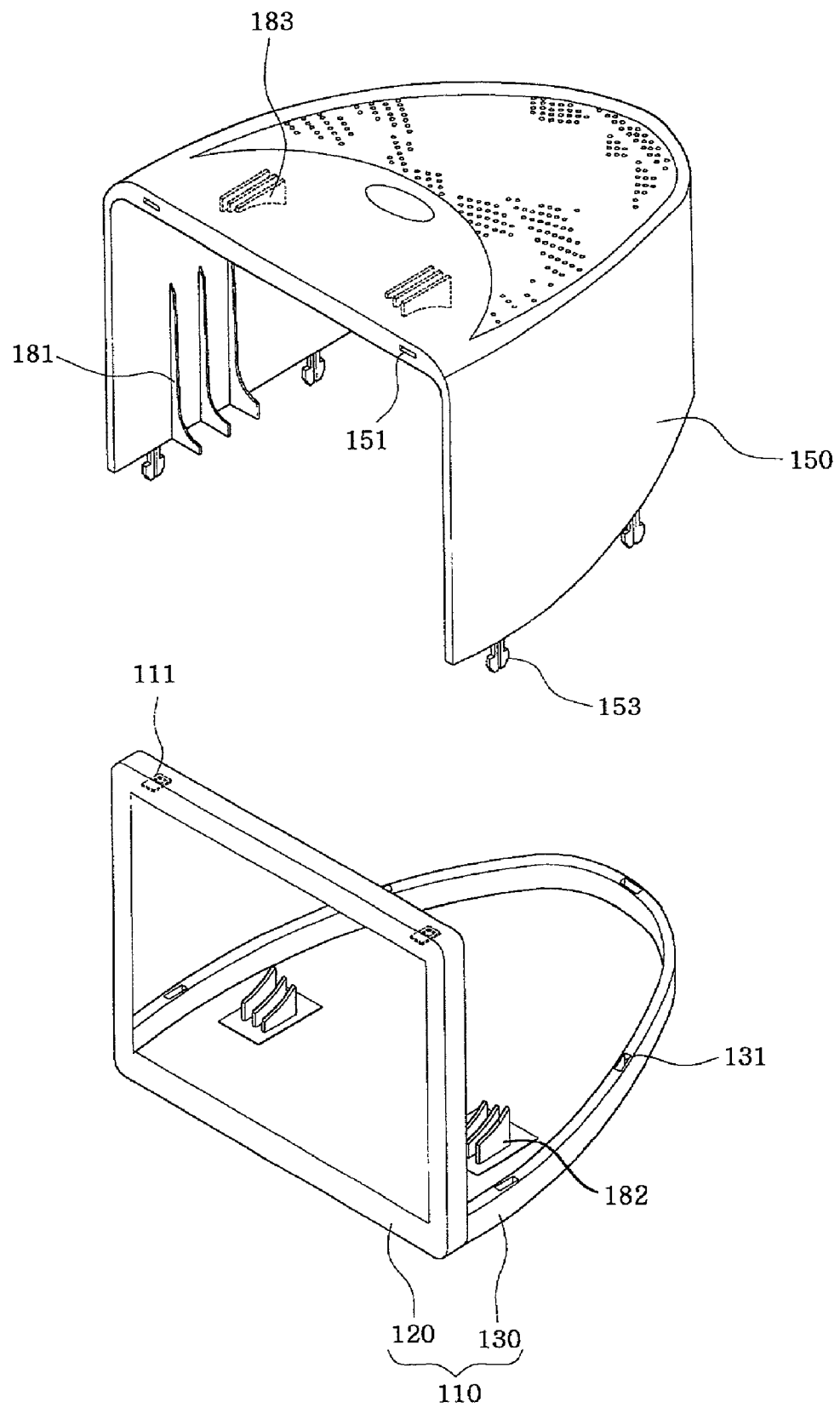
FIG. 4 is an exploded slant view of still another embodiment of a monitor having ribs for fixing a CRT.

FIG. 3 and FIG. 4 are exploded slant view of other embodiments of the monitor having ribs for fixing a CRT according to the present invention. For convenience's sake, the monitor, the main board and the main sash are not illustrated.

A monitor having ribs for fixing a CRT of FIG. 3 features that said rear cover 150 is divided into an upper cover 160 and a lower cover 170.

A plurality of inserting protrusions 171 are formed at the end section of the protruded edges of said lower cover 170 at constant intervals while a plurality of inserting grooves into which said inserting protrusions 171 are inserted are formed at the end section of the projected edges of said upper cover 160. At inner side surfaces and the ceiling surface of the upper cover 160, there are formed side fixing ribs 181 extended to part of the ceiling surface of the upper cover 160, and upper fixing ribs 183 while matching the shape and inclination of the sides and upper surface of the CRT 200. At inner side surfaces and bottom surface of the lower cover 170, there are formed side fixing ribs 181 extended to part of said bottom surface, and lower fixing ribs 182.

In this embodiment, the processes of fixing the CRT and assembling the monitor are as follows:

The main sash 500 is formed onto the lower cover 170, and the CRT 200 is matched by said fixing ribs for the CRT and combined with the main sash 500. Then the CRT 200 is covered by the shield cover 300, and said upper cover 160 is pushed face to face to upper portion of the lower cover 170 so that the inserting protrusions 171 of the lower cover 170 can be inserted into the inserting grooves 161 of the upper cover 160. At this time, the exterior of the CRT 200 is fitted tightly into the fixing ribs which comprise the side fixing ribs 181, lower fixing ribs 182 and upper fixing ribs 183. Then the CRT is fixed at one time. And said front cover 110 is fitted by fitting protrusions 111 into the fitting grooves 151 formed at the front portion of combined body of the upper and the lower cover. Then the assembling of the monitor is completed.

The embodiment of FIG. 4 features that the front cover 110 is formed in a body comprising a front panel 120 combined with the screen side of the CRT, and a bottom panel 130 onto which the CRT 200 and the shield cover 300 are mounted, and that the rear cover 150 is a cap type of cover which is combined with the front cover 110 while covering the CRT 200 and the shield cover 300.

The front panel 120 of the front cover 110 has fitting protrusions 111 in the shape of plate at portions close to both corners of upper portion of the inner wall. And the bottom panel 130 has a plurality of inserting grooves 131 at the end section of the protruded edges.

At the upper portion of the front the rear cover 150 there are formed fitting grooves 151 matching the fitting protrusions 111 of the front panel 120, and at the end section of the protruded edges which matches the inserting grooves 131 of the bottom panel 130 there are formed a plurality of inserting protrusions 153.

The side fixing ribs 181 and upper fixing ribs are formed at the rear cover 150, and the lower fixing ribs 182 are formed at the bottom panel 130 of the rear cover 110.

In order to fix and assemble the CRT 200 according to this embodiment, the main sash 500 and the CRT 200 are mounted by being matched against the lower fixing ribs 182 of the bottom panel 130 of the front cover 110. And the CRT 200 is covered by the shield cover 300, and then the fitting hooks 153 of the rear cover 150 is fitted into the fitting grooves 131 of the bottom panel 130 of the front cover 110 while the fitting protrusions 111 formed at edge sections of the upper portion of the front cover 110 are fitted into the fitting grooves 151 formed at the front of the rear cover 150.

The scope of the present invention is not limited to the embodiments described. For instance, the fitting projections and fitting grooves of the front and the rear cover, and the inserting protrusions and inserting grooves, etc. of the upper and the lower cover can be formed in exchanged positions.

In other words, the scope of the present invention includes all technological ideas by which the CRT is safely fixed and the monitor is easily assembled through binding force between the covers joined by such joining members as inserting protrusions and inserting grooves, and by fixing ribs for the CRT which match the shape and contours of the outer periphery of the CRT regardless of the number and shape of the combined covers.

INDUSTRIAL APPLICABILITY

As for the monitor having ribs for fixing a CRT according to the present invention, since the CRT is fixed by the binding force between the covers comprising the monitor case and by said fixing ribs for the CRT, fixing lugs at each edges of the CRT are not necessary. Accordingly, there arises a merit that the size of the monitor can be reduced close to the actual screen size. And various kinds of incidental expenses for transportation and loading of the CRT are also reduced since the size of the CRT can be reduced.

Since an extra process of fixing the CRT with screws is omitted, assembly of the CRT becomes more easy and convenient, and productivity becomes high due to reduced number of the working process. And the risk of damage of the monitor case is very low since the weight of the CRT is dispersed and supported by the fixing ribs for the CRT.

What is claimed is:

1. A monitor having ribs for fixing a CRT comprising
   a CRT,
   a shield cover which is assembled enclosing said CRT from behind and
   a monitor case composed of at least two covers which enclose said CRT and said shield cover, said covers being joined one another by joining members,
   characterized in that the monitor case comprises the ribs in its inner surface, which are formed protruding along the widthwise and lengthwise direction of the CRT, in accordance with the shape and contours of the outer periphery of the CRT so as to enclose and support the CRT, and the CRT is inserted between the ribs and the covers joined by said joining members, and is fixed therein only by the binding force between said covers and the supporting force of the ribs.

2. The monitor having ribs for fixing a CRT according to claim 1, wherein said ribs for fixing the CRT comprises side fixing ribs which are protruded from both sides of the inner surface of the monitor case in accordance with the contours of side surfaces of the CRT so that the protruded surfaces of said side fixing ribs match the shape of side surface of the CRT, and lower fixing ribs which are protruded from the lower inner surface of the monitor case in accordance with the contours of bottom surface of the CRT so that the protruded surface of said lower fixing ribs matches the shape of bottom surface of the CRT.

3. The monitor having ribs for fixing a CRT according to claim 2, wherein said ribs for fixing the CRT further comprises upper fixing ribs which are protruded from the upper inner surface of the monitor case in accordance with the contours of top surface of the CRT so that the protruded surface of said lower fixing ribs matches the shape of top surface of the CRT.

4. The monitor having ribs for fixing a CRT according to claim 1, 2 or 3 wherein said monitor case comprises a front cover which has fitting protrusions on its inner surface and is combined with the screen side of the CRT and a rear cover which encloses said CRT and said shield cover enclosing said CRT, and has, in is front portion, fitting grooves into which said fitting protrusions of the front cover are fitted, and is joined with said front cover.

5. The monitor having ribs for fixing a CRT according to claim 4, wherein a plurality of joining guides which guide joining of the front cover and the rear cover are formed at both side sections of the front surface of the rear cover.

6. The monitor having ribs for fixing a CRT according to claim 4, wherein said rear cover comprises an upper cover which covers an upper portion of the CRT and has a plurality of fitting groove formed with predetermined intervals at the protruded end portion of the edge of said upper cover, and a lower cover which has a plurality of fitting protrusions to be fitted to said fitting grooves at the protruded end portion of the edge of said lower cover so that said lower cover is joined to said upper cover.

7. The monitor having ribs for fixing a CRT according to claim 4, wherein said front cover is formed in a body with the front panel which is joined to the screen side of the CRT and a bottom panel onto which the CRT and the shield cover are mounted, and said shield cover is in a form of lid, which is joined to the front cover while enclosing the CRT and the shield cover.

8. The monitor having ribs for fixing a CRT according to claim 7, wherein said front cover includes a plurality of fitting grooves formed with predetermined intervals at the protruded end portion of the edge of the bottom panel, and said rear cover includes a plurality of fitting protrusions formed with predetermined intervals at the protruded end portion of the edge of said rear cover, said fitting protrusions to be fitted to said fitting grooves.

* * * * *